2,838,372
PRODUCTION OF ELEMENTAL PHOSPHORUS AND FERROUS CHLORIDE

John F. Gall, Narberth, and Gerhard Barth-Wehrenalp, Elkins Park, Pa., assignors to Pennsalt Chemicals Corporation, a corporation of Pennsylvania No Drawing. Application July 5, 1955
Serial No. 520,106

6 Claims. (Cl. 23—87)

This invention relates to the preparation of phosphorus compounds and iron compounds and more particularly to the preparation of elemental phosphorus and ferrous chloride from ferrophosphorus.

The term "ferrophosphorus" is used in its broad sense. By ferrophosphorus is meant, a mixture of iron phosphides, such as $Fe_3P$, $Fe_2P$, $FeP$, $FeP_2$, and possibly others. It might even be considered as a continuous series, or a solid solution, in which the iron and phosphorus are present in any proportion. Ferrophosphorus is generally obtained as a by-product of the phosphate industry. Commercially available ferrophosphorus is graded according to its phosphorus content, which may vary from 15 to 30%, and generally is present in amounts of about 22 to 26%, corresponding roughly to the formula $Fe_2P$. Any grade of ferrophosphorus is suitable in practicing the present invention, even those grades in which the phosphorus content is less than 20%.

In co-pending application Serial No. 520,107, filed July 5, 1955, the separation and recovery of iron and phosphorus in the form of their respective chlorides, ferric chloride and phosphorus trichloride, is described. However, in the process of the present invention the phosphorus is obtained in its uncombined form as free phosphorus and the iron content of the ferrophosphorus is separated as ferrous chloride. The present process is based on the discovery that if ferrophosphorus is treated with chlorine or phosphorus chlorides at certain elevated temperatures in excess of 500° C. and sufficient chlorine is not present to fully chlorinate the ferrophosphorus, elemental phosphorus and ferrous chloride are among the products of the reaction.

In the practice of this invention, solid ferrophosphorus is made to react with a phosphorus chloride or chlorine at a temperature of 500° to 700° C. Elemental phosphorus is formed, and volatilizes from the reaction mixture together with any unreacted phosphorus chlorides. Ferrous chloride is also formed, and remains with the solid, unreacted ferrophosphorus, from which it may be separated and recovered as hereinbelow described.

Materials which, for the purpose of making phosphorus and ferrous chloride according to the present invention, may be considered equivalent to chlorine and which are referred to above as phosphorus chlorides include phosphorus trichloride, phosphorus pentachloride and a complex mixture of phosphorus pentachloride and ferric chloride having the approximate formula $(FeCl_3)_2 \cdot PCl_5$. At the temperatures at which the reaction takes place, the phosphorus chlorides are vapors, the phosphorus pentachloride being dissociated at these temperatures into phosphorus trichloride and chlorine. The phosphorus pentachloride-ferric chloride complex is most advantageously prepared by completely chlorinating ferrophosphorus, and, as hereinbelow described, can be made in situ during the production of elemental phosphorus and ferrous chloride.

Since at reaction temperatures ferrophosphorus is a solid, while the chloride, which may be phosphorus trichloride, phosphorus pentachloride, elemental chlorine or the complex $(FeCl_3)_2 \cdot PCl_5$, is a vapor, the reaction is advantageously carried out in an apparatus which provides a vapor train. The solid ferrophosphorus is placed in the train, and the chloride, which is preferably preheated to above 500° C., is passed through the train. The train may be in the form of a tube furnace or kiln, and any suitable metering devices for the gaseous reactants may be connected therewith. Elemental phosphorus, distilling out of the terminal end of the train is collected in a suitable condensation chamber.

When it is desired to recover the ferrous chloride that is also formed in the reaction, this is advantageously done, after completion of the reaction, by heating the solids remaining in the reaction mixture to temperatures exceeding 670° C., the melting point of ferrous chloride, but below the melting temperature of ferrophosphorus which is about 1300° C. and decanting the molten ferrous chloride off from the solid, unreacted ferrophosphorus.

The following example will help to illustrate the practice of the invention:

A ceramic-lined tube furnace was charged with 709 parts by weight of ferrophosphorus and heated to 500° C. Phosphorus trichloride vapor, totaling 305 parts by weight, was then introduced into the inlet of the furnace. The vapors emerging from the furnace were condensed, and the excess phosphorus trichloride was removed from the condensate by volatilization. The remaining condensate consisted of 14.5 parts by weight of phosphorus. Ferrous chloride, formed simultaneously in the furnace, totaled 51 parts by weight.

It has been found that elemental phosphorus cannot be obtained as a reaction product at temperatures exceeding 700° C.; apparently only higher iron phosphides are formed at these temperatures.

In another method of practicing the present invention, ferrophosphorus is placed in a long tube furnace that is fitted with an inlet for gaseous reactants and a receiving device for recovery of the volatile reaction product. For the preparation of elemental phosphorus, the furnace is kept at a temperature of 500° to 700° C. Anhydrous chlorine is introduced into the furnace in an amount substantially less than that necessary to completely chlorinate the ferrophosphorus present; i. e., an excess of ferrophosphorus is distributed in the furnace in a manner such that the gaseous reactants are always exposed to fresh ferrophosphorus as they pass through the furnace. The gases formed by the reaction of chlorine with ferrophosphorus consist principally of the phosphorus pentachloride-ferric chloride complex, and this complex then further reacts with fresh ferrophosphorus to form elemental phosphorus, which distils out of the action mass and is collected together with some volatile chlorides also formed in the reaction. The volatilization points of these chlorides are substantially lower than that of elemental phosphorus and their subsequent separation can thus be readily accomplished by conventional means. Together with the excess ferrophosphorus remaining in the furnace there is a certain amount of ferrous chloride which has been formed in the reaction. The ferrous chloride is separated from the ferrophosphorus by raising the temperature of the furnace to above 670° C., the furnace is inclined, and the ferrous chloride is drained out into a suitable receiver.

It is possible to effect the separation of phosphorus and ferrous chloride simultaneously if the reaction is carried out in an inclined kiln equipped with a receiver for the volatile phosphorus at the upper end, a receiver for the liquid ferrous chloride at the lower end and an inlet for gaseous reactants. The temperature in this case must be kept between 670° C. and approximately 700° C., i. e., above the melting temperature of ferrous chloride and within the temperature range in which phosphorus is formed.

In the specification and in the claims the present invention is described as being carried out at atmospheric pressure. As with most chemical reactions, pressures greater or less than atmospheric pressure may be used. If pressures substantially below or above atmospheric pressure are employed it is apparent that the temperature limitations will vary somewhat as would be expected, the temperatures being slightly lower for reduced pressures and slightly higher for higher pressures. Any such variations are intended to be included in the present specification and claims.

Having described my invention I claim:

1. In the recovery of iron and phosphorus from ferrophosphorus the process comprising heating ferrophosphorus with at least one material of the group consisting of chlorine, phosphorus trichloride, phosphorus pentachloride and $(FeCl_3)_2 \cdot PCl_5$ in an amount insufficient to fully chlorinate said ferrophosphorus, at a temperature of 500° to 700° C. to form elemental phosphorus and ferrous chloride and separating said elemental phosphorus as formed.

2. In the recovery of iron and phosphorus from ferrophosphorus the process comprising heating ferrophosphorus with a phosphorus chloride in an amount insufficient to fully chlorinate said ferrophosphorus, at a temperature of 500° C. to 700° C. to form elemental phosphorus and ferrous chloride.

3. The process of claim 1 wherein the residue after removal of said elemental phosphorus is heated to a temperature of at least 670° C. to melt said ferrous chloride and separating said molten ferrous chloride from any unreacted ferrophosphorus.

4. The process of claim 1 wherein said reaction is carried out at a temperature of 670° C. to 700° C. and said elemental phosphorus and said ferrous chloride are removed as formed.

5. In the recovery of iron and phosphorus from ferrophosphorus the process comprising heating ferrophosphorus to a temperature of 500° to 700° C. and maintaining said ferrophosphorus within this temperature range while adding thereto in their vapor state at least one material of the group consisting of chlorine, phosphorus trichloride, phosphorus pentachloride and $(FeCl_3)_2 \cdot PCl_5$, in an amount insufficient to fully chlorinate said ferrophosphorus, maintaining the resulting reaction mixture within this temperature range to form ferrous chloride and elemental phosphorus and separating said elemental phosphorus as formed.

6. The process of claim 4 wherein said ferrous chloride is drained off by gravity as formed.

References Cited in the file of this patent

UNITED STATES PATENTS

| | | |
|---|---|---|
| 1,859,543 | Urbain | May 24, 1932 |

FOREIGN PATENTS

| | | |
|---|---|---|
| 12,553/28 | Australia | Mar. 28, 1928 |

OTHER REFERENCES

"Handbook of Chemistry and Physics," 14th ed., by C. D. Hodgman and N. A. Lange, page 657, Chemical Rubber Publishing Co., Cleveland, Ohio.